US012777361B2

(12) United States Patent
Ueno et al.

(10) Patent No.: US 12,777,361 B2
(45) Date of Patent: Oct. 27, 2026

(54) SYSTEM AND DEVICE FOR WIRELESS COMMUNICATION

(71) Applicant: Panasonic Intellectual Property Management Co., Ltd., Osaka (JP)

(72) Inventors: Taku Ueno, Nara (JP); Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 415 days.

(21) Appl. No.: 18/237,566

(22) Filed: Aug. 24, 2023

(65) Prior Publication Data

US 2025/0071599 A1 Feb. 27, 2025

(51) Int. Cl.
*H04W 28/02* (2009.01)

(52) U.S. Cl.
CPC ............................... *H04W 28/0236* (2013.01)

(58) Field of Classification Search
None
See application file for complete search history.

(56) References Cited

U.S. PATENT DOCUMENTS 10,009,910 B2 * 6/2018 Reis ...................... H04W 4/029
2005/0083838 A1 * 4/2005 Kandala .................. H04L 47/50 370/230
2007/0177539 A1 * 8/2007 Nakano ................. H04W 74/06 370/328
2010/0146111 A1 * 6/2010 Shacham .................. G06F 9/54 709/224

(Continued)

FOREIGN PATENT DOCUMENTS

CA 2688135 A1 * 2/2009 .......... H04W 72/542
CN 1127059 A * 7/1996 .......... H04W 36/302

(Continued)

OTHER PUBLICATIONS

Extended European Search Report issued Jan. 17, 2025 in corresponding European Patent Application No. 24195611.9.

*Primary Examiner* — Andrew C Oh

(74) *Attorney, Agent, or Firm* — Wenderoth, Lind & Ponack, L.L.P.

(57) ABSTRACT

A wireless communication system includes wireless communication devices capable of performing wireless communication with a wireless communication terminal and each disposed at a different position. The wireless communication devices include: a storage device configured to hold radio wave intensity data corresponding to position information of each of the wireless communication devices; and a processing device configured to, when starting communication with the wireless communication terminal, calculate a region in which interference of radio waves is able to occur based on the radio wave intensity data, calculate a usage status of a communication resource by the wireless communication devices present in the region based on a communication status of the wireless communication devices present in the region among the wireless communication devices, and adjust a communication parameter that defines a transmission amount of data in communication with the wireless communication terminal based on a calculation result of the usage status.

14 Claims, 11 Drawing Sheets

| SEAT MONITOR | AUDIO COMMUNICATION RATE | WIRELESS SECTION COMMUNICATION RATE | WIRELESS USAGE RATE |
|---|---|---|---|
| 3A | 400kbps | 1Mbps | 1% |
| 4A | 400kbps | 1Mbps | 1% |
| 5A | 400kbps | 1Mbps | 1% |
| 4B | 400kbps | 1Mbps | 1% |
| 3C | 400kbps | 1Mbps | 1% |
| 5C | 400kbps | 1Mbps | 1% |
| 3D | 400kbps | 1Mbps | 1% |
| 5D | 400kbps | 1Mbps | 1% |
| 4E | 400kbps | 1Mbps | 1% |
| 4C (ADDITIONAL) | 400kbps | 1Mbps | 1% |
| TOTAL | | | 10% |

(56) References Cited

U.S. PATENT DOCUMENTS

| | | | | |
|---|---|---|---|---|
| 2010/0248631 | A1* | 9/2010 | Chaudhri | H04W 72/563 455/62 |
| 2015/0003344 | A1 | 1/2015 | Suwa | |
| 2015/0289142 | A1 | 10/2015 | Abeysekera et al. | |
| 2016/0119914 | A1 | 4/2016 | Oizumi et al. | |
| 2017/0188377 | A1 | 6/2017 | Reis et al. | |
| 2017/0251469 | A1* | 8/2017 | Lee | H04W 72/0446 |
| 2022/0117025 | A1 | 4/2022 | Narukami | |

FOREIGN PATENT DOCUMENTS

| | | | | | |
|---|---|---|---|---|---|
| JP | 2009-206805 | | | 9/2009 | |
| JP | 5152472 | B2 | * | 2/2013 | H04W 72/27 |
| JP | 2015-12471 | | | 1/2015 | |
| JP | 2015223001 | A | * | 12/2015 | H04W 16/10 |
| JP | 2016-86238 | | | 5/2016 | |
| JP | 2023-58263 | | | 4/2023 | |
| JP | 2023058263 | A | * | 4/2023 | Y02D 30/70 |
| KR | 101421297 | B1 | * | 7/2014 | H04W 16/24 |
| WO | 2014/073706 | | | 5/2014 | |
| WO | 2021/005746 | | | 1/2021 | |

* cited by examiner

FIG. 7

| SEAT MONITOR | AUDIO COMMUNICATION RATE | WIRELESS SECTION COMMUNICATION RATE | WIRELESS USAGE RATE |
|---|---|---|---|
| 3A | 400kbps | 1Mbps | 1% |
| 4A | 400kbps | 1Mbps | 1% |
| 5A | 400kbps | 1Mbps | 1% |
| 4B | 400kbps | 1Mbps | 1% |
| 3C | 400kbps | 1Mbps | 1% |
| 5C | 400kbps | 1Mbps | 1% |
| 3D | 400kbps | 1Mbps | 1% |
| 5D | 400kbps | 1Mbps | 1% |
| 4E | 400kbps | 1Mbps | 1% |
| 4C (ADDITIONAL) | 400kbps | 1Mbps | 1% |
| TOTAL | | | 10% |

FIG. 8

| SEAT MONITOR | AUDIO COMMUNICATION RATE | WIRELESS SECTION COMMUNICATION RATE | WIRELESS USAGE RATE |
|---|---|---|---|
| 3A | 300kbps | 1Mbps | 0.75% |
| 4A | 300kbps | 1Mbps | 0.75% |
| 5A | 300kbps | 1Mbps | 0.75% |
| 4B | 300kbps | 1Mbps | 0.75% |
| 3C | 300kbps | 1Mbps | 0.75% |
| 5C | 300kbps | 1Mbps | 0.75% |
| 3D | 300kbps | 1Mbps | 0.75% |
| 5D | 300kbps | 1Mbps | 0.75% |
| 4E | 300kbps | 1Mbps | 0.75% |
| 4C (ADDITIONAL) | 300kbps | 1Mbps | 0.75% |
| | TOTAL | | 7.5% |

FIG. 9

| SEAT MONITOR | AUDIO COMMUNICATION RATE | WIRELESS SECTION COMMUNICATION RATE | WIRELESS USAGE RATE |
|---|---|---|---|
| 3A | 400kbps | 1Mbps | 1.0% |
| 4A | 400kbps | 1Mbps | 1.0% |
| 5A | 400kbps | 1Mbps | 1.0% |
| 4B | 400kbps | 1Mbps | 1.0% |
| 3C | 400kbps | 1Mbps | 1.0% |
| 5C | 300kbps | 1Mbps | 0.75% |
| 3D | 300kbps | 1Mbps | 0.75% |
| 5D | 300kbps | 1Mbps | 0.75% |
| 4E | 300kbps | 1Mbps | 0.75% |
| 4C (ADDITIONAL) | 300kbps | 1Mbps | 0.75% |
| TOTAL | | | 8.75% |

FIG. 11

| SEAT MONITOR | AUDIO COMMUNICATION RATE | WIRELESS SECTION COMMUNICATION RATE | WIRELESS USAGE RATE |
|---|---|---|---|
| 2A | 400kbps | 2Mbps | 0.5% |
| 2B | 400kbps | 2Mbps | 0.5% |
| 2E | 400kbps | 2Mbps | 0.5% |
| 3A | 400kbps | 2Mbps | 0.5% |
| 4A | 400kbps | 2Mbps | 0.5% |
| 5A | 400kbps | 2Mbps | 0.5% |
| 4B | 400kbps | 2Mbps | 0.5% |
| 3C | 400kbps | 2Mbps | 0.5% |
| 5C | 400kbps | 2Mbps | 0.5% |
| 3D | 400kbps | 2Mbps | 0.5% |
| 5D | 400kbps | 2Mbps | 0.5% |
| 4E | 400kbps | 2Mbps | 0.5% |
| 6A | 400kbps | 2Mbps | 0.5% |
| 6B | 400kbps | 2Mbps | 0.5% |
| 6E | 400kbps | 2Mbps | 0.5% |
| 4C (ADDITIONAL) | 400kbps | 2Mbps | 0.5% |
| | TOTAL | | 8% |

SYSTEM AND DEVICE FOR WIRELESS COMMUNICATION

BACKGROUND OF THE INVENTION

1. Field of the Invention

The present disclosure relates to a wireless communication system and a wireless communication device.

2. Background of the Art

Various methods have been proposed in the related art as methods for controlling and sharing a limited communication resource such as wireless. The communication resource is, for example, a frequency band used for communication. For example, JP2009-206805A discloses a wireless communication system in which a wireless terminal and a wireless base station communicate with each other via wireless.

SUMMARY OF THE INVENTION

The present disclosure provides a wireless communication system and wireless communication devices capable of ensuring constant communication quality even when a plurality of wireless communication devices and a wireless communication terminal share one communication resource.

The present disclosure provides a wireless communication system including: a plurality of wireless communication devices capable of performing wireless communication with a wireless communication terminal and disposed at different positions. The wireless communication devices include: a storage device configured to hold radio wave intensity data corresponding to position information of each of the plurality of wireless communication devices; and a processing device configured to, when communication with the wireless communication terminal is started, calculate a region in which interference of radio waves is able to occur based on the radio wave intensity data, calculate a usage status of a communication resource by the wireless communication devices present in the region based on a communication status of the wireless communication devices present in the region among the plurality of wireless communication devices, and adjust a communication parameter that defines a transmission amount of data in communication with the wireless communication terminal based on a calculation result of the usage status.

In addition, the present disclosure provides a wireless communication device capable of performing wireless communication with a wireless communication terminal, the wireless communication device including: a storage device configured to hold radio wave intensity data corresponding to position information of each of a plurality of the wireless communication devices disposed at different positions; and a processing device configured to, when communication with the wireless communication terminal is started, calculate a region in which interference of radio waves is able to occur based on the radio wave intensity data, calculate a usage status of a communication resource by the wireless communication devices present in the region based on a communication status of the wireless communication devices present in the region among the plurality of wireless communication devices, and adjust a communication parameter that defines a transmission amount of data in communication with the wireless communication terminal based on a calculation result of the usage status.

According to the present disclosure, constant communication quality can be ensured even when the plurality of wireless communication devices and the wireless communication terminal share one communication resource.

BRIEF DESCRIPTION OF THE DRAWINGS

FIG. 7 is a table illustrating an example of management of communication parameters according to Embodiment 1;

FIG. 8 is a table illustrating an example of management of communication parameters according to Embodiment 1;

FIG. 9 is a table illustrating an example of management of communication parameters according to Embodiment 1;

FIG. 11 is a table illustrating an example of management of communication parameters according to Embodiment 1.

Figure 1:
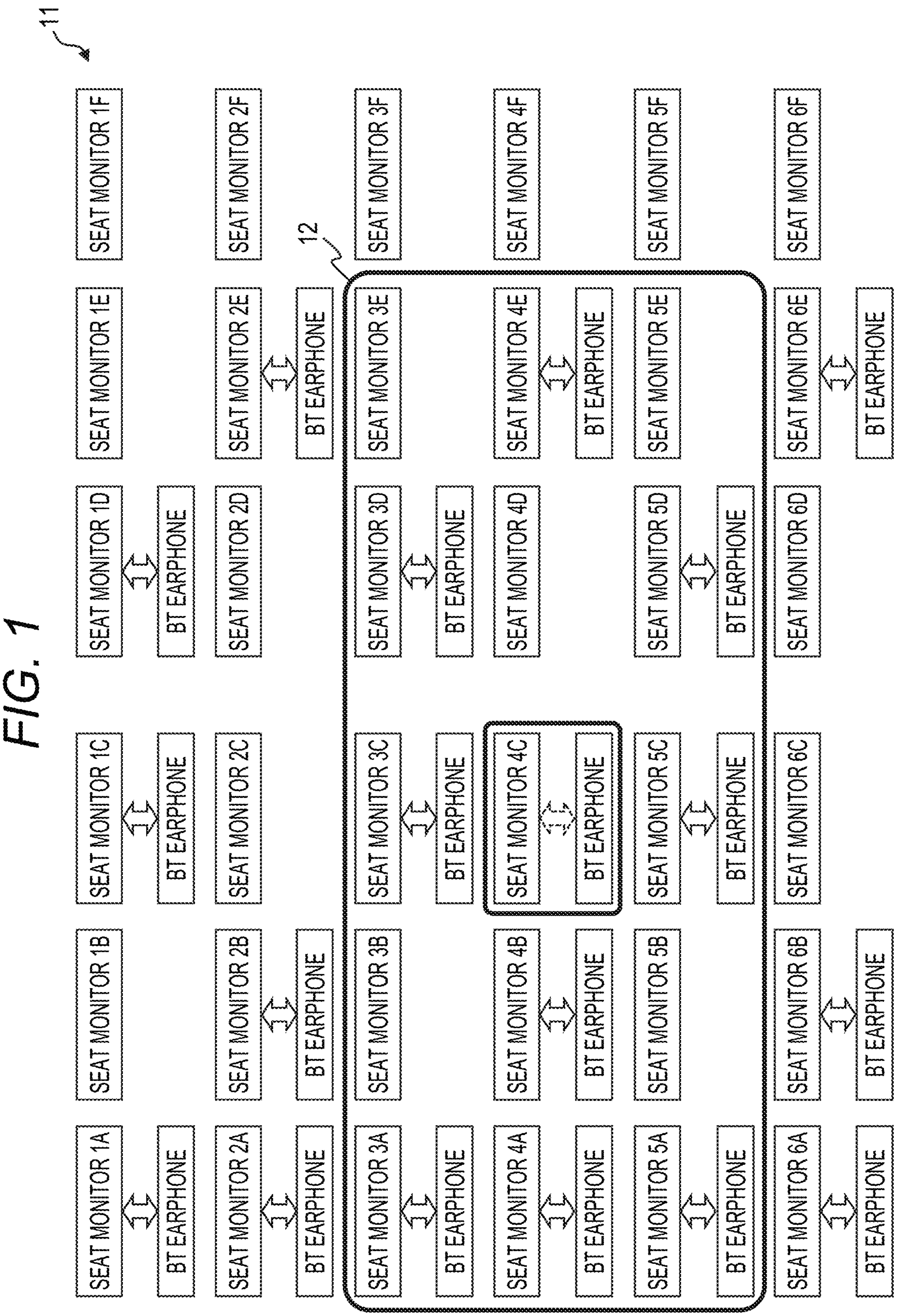
FIG. 1 is a schematic diagram illustrating a configuration example of a wireless communication system according to Embodiment 1.

DETAILED DESCRIPTION OF THE EXEMPLARY EMBODIMENT (Background of Present Disclosure)

In recent years, a portable personal terminal such as a smartphone or a tablet has rapidly become widespread, and a user of the personal terminal can browse a website and listen to a music regardless of location or time. In addition, the personal terminal such as a smartphone or a tablet may have a standard function of connecting to an external device. Accordingly, the user of the personal terminal can bring a personal terminal into a moving body such as an automatic vehicle or an aircraft, and connect a display device or the like mounted on the moving body with the personal terminal by a connection unit such as Bluetooth (registered trademark) to execute a cooperative operation between the display device or the like and the personal terminal.

In addition to the spread of Bluetooth (registered trademark), a headphone and earphones compatible with Bluetooth (registered trademark) have rapidly become widespread. For example, a passenger of an aircraft can view a movie and listen to a music by wirelessly connecting a device such as a headphone, earphones, or a headset compatible with Bluetooth (registered trademark) owned by an individual to a monitor of an in-flight entertainment system for the aircraft via Bluetooth (registered trademark). Hereinafter, the device such as a headphone, earphones, and a headset is collectively referred to as an earphone.

An industrial, scientific, and medical (hereinafter referred to as "ISM") band allocated to Bluetooth (registered trademark) communication is a limited frequency band of 2.4 GHz to 2.5 GHz. Therefore, in a limited space such as a cabin of the aircraft, when a plurality of passengers simultaneously use the Bluetooth (registered trademark) communication, communication, in other words, radio waves interfere with each other, and the Bluetooth (registered trademark) communication may not be simultaneously used.

In a cellular wireless communication system in the related art, a wireless area supported by a base station is determined for each of a plurality of base stations. The base station allocates a communication resource to a wireless communication terminal present in the supported wireless area within a range of a communication capacity that can be implemented by the communication resource allocated to the wireless area. For example, when a communication resource of 20 MHz is allocated to a certain wireless area and a communication capacity that can be implemented in the wireless area is 20 Mbps, a base station supporting the wireless area allocates the communication capacity of 20 Mbps to the wireless communication terminal present in the wireless area. It is assumed that the wireless areas are independent and do not interfere with each other. Each base station allocates the communication capacity that can be implemented by the communication resource allocated to each wireless area to the wireless communication terminal present in each wireless area.

However, for example, in the limited space such as the cabin of the aircraft, when a plurality of wireless communication devices such as monitors built in seats and a plurality of wireless communication terminals such as earphones compatible with the Bluetooth (registered trademark) perform Bluetooth (registered trademark) communication with each other, the plurality of wireless communication devices and the plurality of wireless communication terminals can share one communication resource. In such a case, it is difficult to apply a communication resource control method assuming that the communication resource is limited for each wireless communication device as in the related art.

Therefore, in the following embodiment, a description will be given of a technique capable of ensuring constant communication quality even when the plurality of wireless communication devices and the plurality of wireless communication terminals share one communication resource.

Hereinafter, embodiments specifically disclosing a wireless communication system and a wireless communication device according to the present disclosure will be described in detail with reference to the drawings as appropriate. However, more detailed description may be omitted. For example, a detailed description of a well-known matter and a redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Embodiment 1

Hereinafter, Embodiment 1 will be described with reference to FIGS. 1 to 11.

[Configuration Example of Wireless Communication System]

Configuration examples of a wireless communication system 11 according to Embodiment 1 will be described with reference to FIGS. 1 and 2. FIG. 1 is a schematic diagram illustrating the configuration example of the wireless communication system 11 according to Embodiment 1.

In the present embodiment, a space having the wireless communication system 11 will be described as a cabin of an aircraft. The wireless communication system 11 includes a plurality of wireless communication devices and a plurality of wireless communication terminals. In the present embodiment, the wireless communication devices will be described as monitors built in respective seats of the aircraft. In addition, in the present embodiment, the wireless communication terminals will be described as earphones compatible with Bluetooth 10 (registered trademark). Hereinafter, the monitor built in the seat of the aircraft may be referred to as a seat monitor. In addition, hereinafter, the earphones compatible with Bluetooth (registered trademark) may be referred to as a BT earphone.

The seats of the aircraft are usually arranged in rows and columns. As shown in FIG. 1, seat monitors 1A to 6A, seat monitors 1B to 6B, seat monitors 1C to 6C, seat monitors 1D to 6D, seat monitors 1E to 6E, and seat monitors 1F to 6F, which are wireless communication devices, are arranged in rows and columns.

In the cabin of the aircraft, a seated passenger faces a seat monitor. The seat monitor performs one-to-one wireless communication with the BT earphone, which is the wireless communication terminal owned by the passenger facing the seat monitor. In the present embodiment, the wireless communication will be described as Bluetooth (registered trademark) communication. Hereinafter, the description of wireless communication and communication means Bluetooth (registered trademark) communication. The seat monitor performs Bluetooth (registered trademark) communication with the BT earphone brought in by the passenger of the aircraft, and transmits audio data of a content such as a movie or a music played by the seat monitor to the BT earphone. Accordingly, the passenger can listen to an audio of the content such as a movie or a music through the BT earphone.

In the example of FIG. 1, in the wireless communication system 11, each of the seat monitor 1A, the seat monitor 1C, the seat monitor 1D, the seat monitor 2A, the seat monitor 2B, the seat monitor 2E, the seat monitor 3A, the seat monitor 3C, the seat monitor 3D, the seat monitor 4A, the seat monitor 4B, the seat monitor 4E, the seat monitor 5A, the seat monitor 5C, the seat monitor 5D, the seat monitor 6A, the seat monitor 6B, and the seat monitor 6E communicates with the BT earphone. In addition, the seat monitor 4C newly starts the Bluetooth (registered trademark) communication with the BT earphone.

An interference region 12 is a region in which, when the seat monitor 4C communicates with the BT earphone, communication, in other words, radio waves of the seat monitor 4C may interfere with radio waves of other seat monitors. That is, when the seat monitors other than the seat monitor 4C present in the interference region 12 are communicating, when the seat monitor 4C starts communication, interference may occur between the radio waves of the seat monitor 4C and the radio waves of the other seat monitors during communication.

In the example of FIG. 1, the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D which already perform communication are provided in the interference region 12 when the seat monitor 4C performs communication. Therefore, when the seat monitors temporarily perform communication on the same channel at the same time as the seat monitor 4C, the communication may not be performed normally due to interference.

Figure 2:
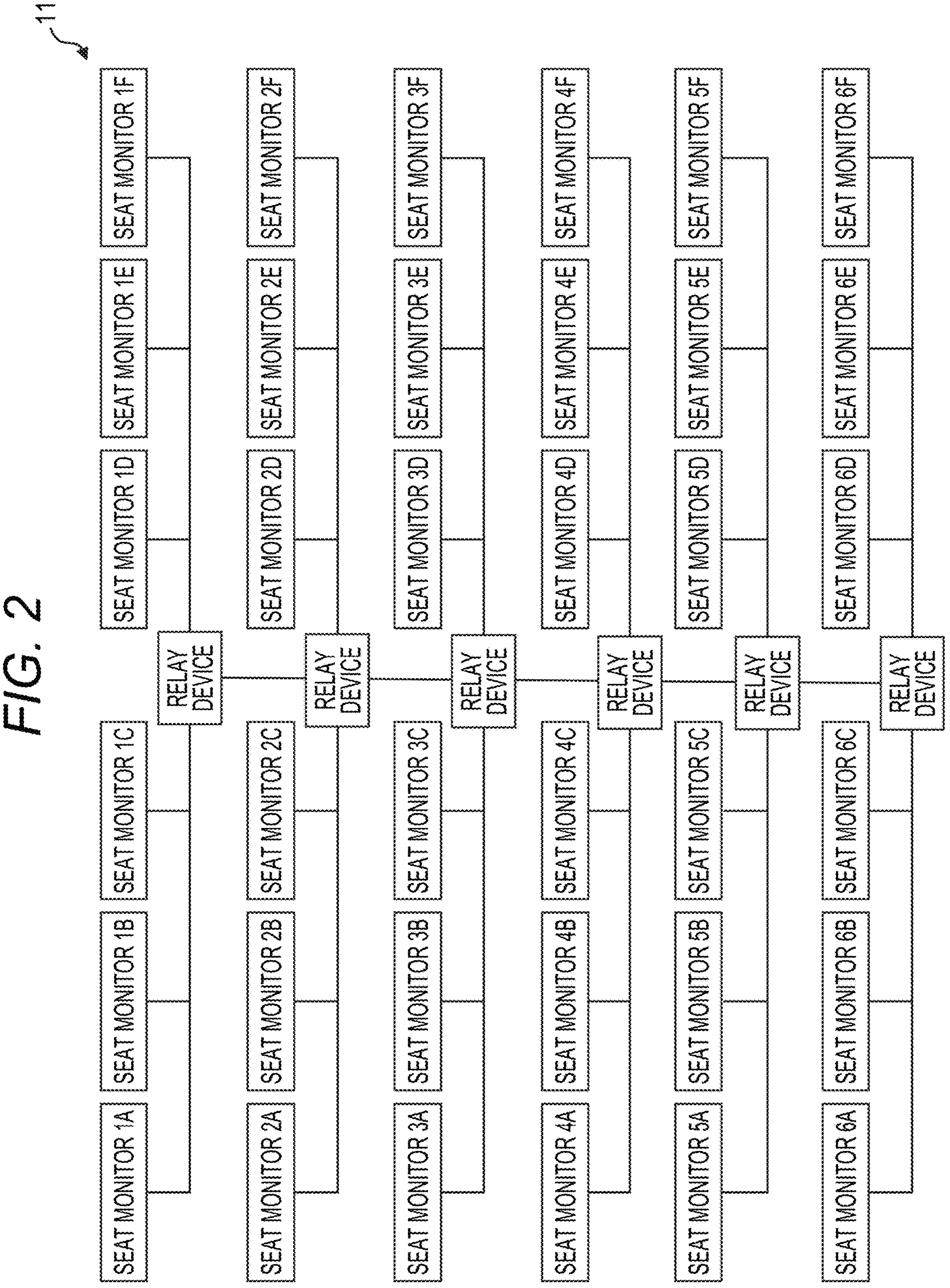
FIG. 2 is a schematic diagram illustrating a configuration example of the wireless communication system according to Embodiment 1.

FIG. 2 is a schematic diagram illustrating the configuration example of the wireless communication system 11 according to Embodiment 1. In the wireless communication system 11 according to the present embodiment, the seat monitors are connected to one another in a wired manner via a relay device. The seat monitors can transmit and receive data to and from each other through wired connection.

The seat monitor can acquire position information including an absolute position of the other seat monitors present in the cabin of the aircraft. In addition, the seat monitor can acquire and hold received radio wave intensity data indicating an intensity of radio waves received by the seat monitor when the other seat monitors are communicating, and the received radio wave intensity data correspond to the position information of the other seat monitors. For example, an intensity of radio waves received by the seat monitor 4C when the seat monitor 1D is communicating is likely to be lower than an intensity of radio waves received by the seat monitor 4C when the seat monitor 3C is communicating. This is because the closer a distance between the seat monitors is, the higher an intensity of radio waves received by one seat monitor from another seat monitor may be. However, the intensity of the radio waves is determined not only by the distance but also by various factors.

The seat monitor can calculate an interference region based on the received radio wave intensity data. For example, the seat monitor 4C can calculate the interference region 12 based on the received radio wave intensity data.

In addition, the seat monitor can recognize a seat monitor that performs communication and may interfere with the communication of the above seat monitor based on the calculated interference region. Further, the seat monitor can acquire a communication status of the seat monitor that performs communication and may interfere with the communication of the above seat monitor. The communication status includes whether communication is being performed and communication parameters to be described later.

In the example of FIG. 1, when the seat monitor 4C starts communication, the seat monitor 4C can recognize that the seat monitors that perform communication and may interfere with the communication of the seat monitor 4C are the seat monitor 3A, the seat monitor 3B, the seat monitor 3C, the seat monitor 3D, the seat monitor 3E, the seat monitor 4A, the seat monitor 4B, the seat monitor 4D, the seat monitor 4E, the seat monitor 5A, the seat monitor 5B, the seat monitor 5C, the seat monitor 5D, and the seat monitor 5E. The seat monitor 4C further recognizes that the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D among the seat monitors perform communication, and recognizes communication parameters of each seat monitor performing communication. The communication parameters include an application data communication rate and a wireless section communication rate. The application data communication rate is a communication rate of an application layer. Simply put, the application data communication rate is an amount of data transmitted in a predetermined time when an application performs communication. The application data communication rate includes an audio communication rate that defines a transmission amount of audio data including audio information of a content such as a movie or a music. The larger the audio communication rate, the better an audio quality of the content such as a movie or a music. The wireless section communication rate is an allowable amount of data that can be transmitted in a predetermined time in wireless communication, in other words, a communication capacity. The larger the wireless section communication rate, the faster a communication speed. In addition, the wireless section communication rate may be uniformly set in the wireless communication system 11 by a user such as an administrator of the wireless communication system 11. In other words, the communication parameters are communication conditions.

[Configuration Example of Wireless Communication Device]

Figure 3:
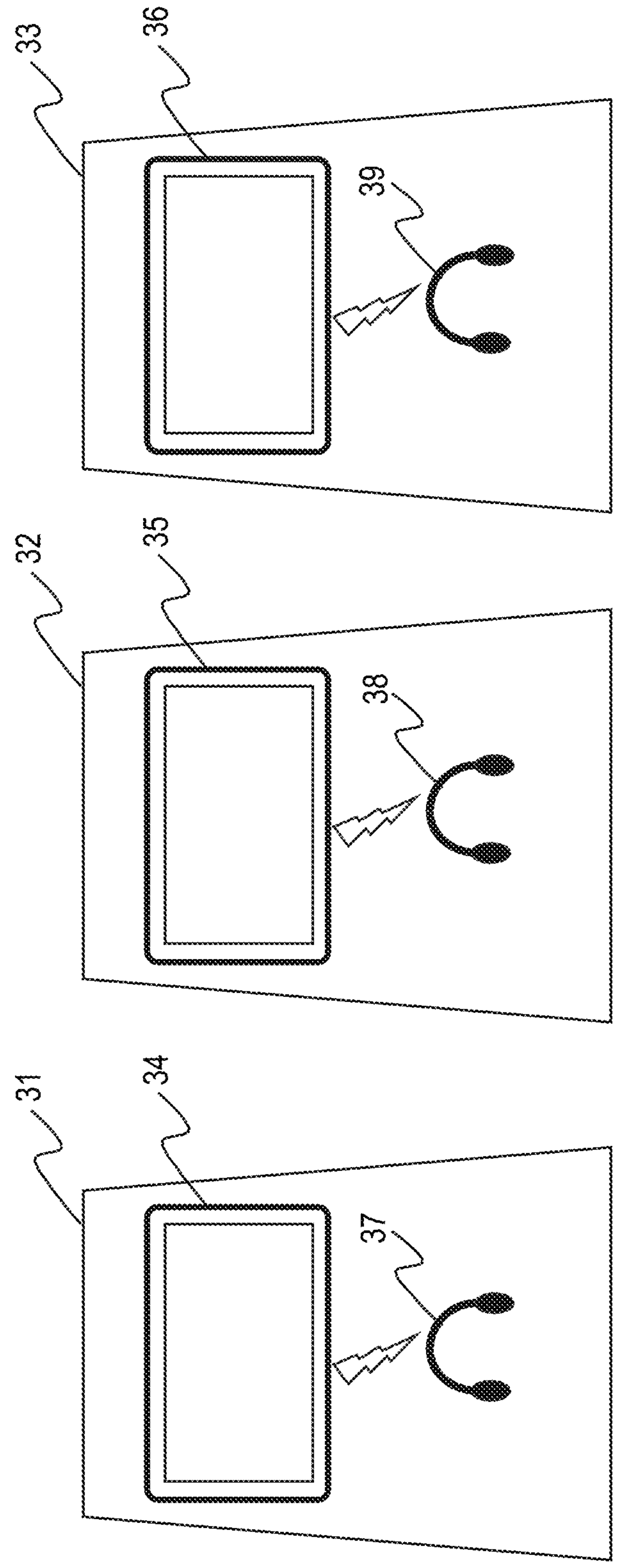
FIG. 3 is a schematic diagram illustrating an example of wireless communication devices according to Embodiment 1.

Next, an image of communication according to the present embodiment will be described with reference to FIG. 3. FIG. 3 is a schematic diagram illustrating an example of the wireless communication devices according to Embodiment 1.

A seat monitor 34, a seat monitor 35, and a seat monitor 36, which are examples of the wireless communication devices, are arranged so as to be fitted into recesses provided in parts of back surfaces of a seat 31, a seat 32, and a seat 33 arranged in a row in the cabin of the aircraft, respectively. The content such as a movie and a music is provided to the passengers through the seat monitor 34, the seat monitor 35, and the seat monitor 36.

In the present embodiment, the seat monitor 34, the seat monitor 35, and the seat monitor 36 each transmit audio data of the content such as a movie or a music to a BT earphone 37, a BT earphone 38, and a BT earphone 39 via Bluetooth (registered trademark) communication. Accordingly, the passenger wearing the BT earphone 37, the BT earphone 38, or the BT earphone 39 can listen to an audio of the content such as a movie or a music.

In addition, the seat monitor and the BT earphone perform one-to-one communication. For example, the seat monitor 34 communicates with the BT earphone 37, the seat monitor 35 communicates with the BT earphone 38, and the seat monitor 36 communicates with the BT earphone 39. At this time, for example, it is preferred that the communication between the seat monitor 34 and the BT earphone 37 and the communication between the seat monitor 35 and the BT earphone 38 do not interfere with each other. That is, the communication between the seat monitor and the BT earphone is required not to interfere with other communication.

Figure 4:
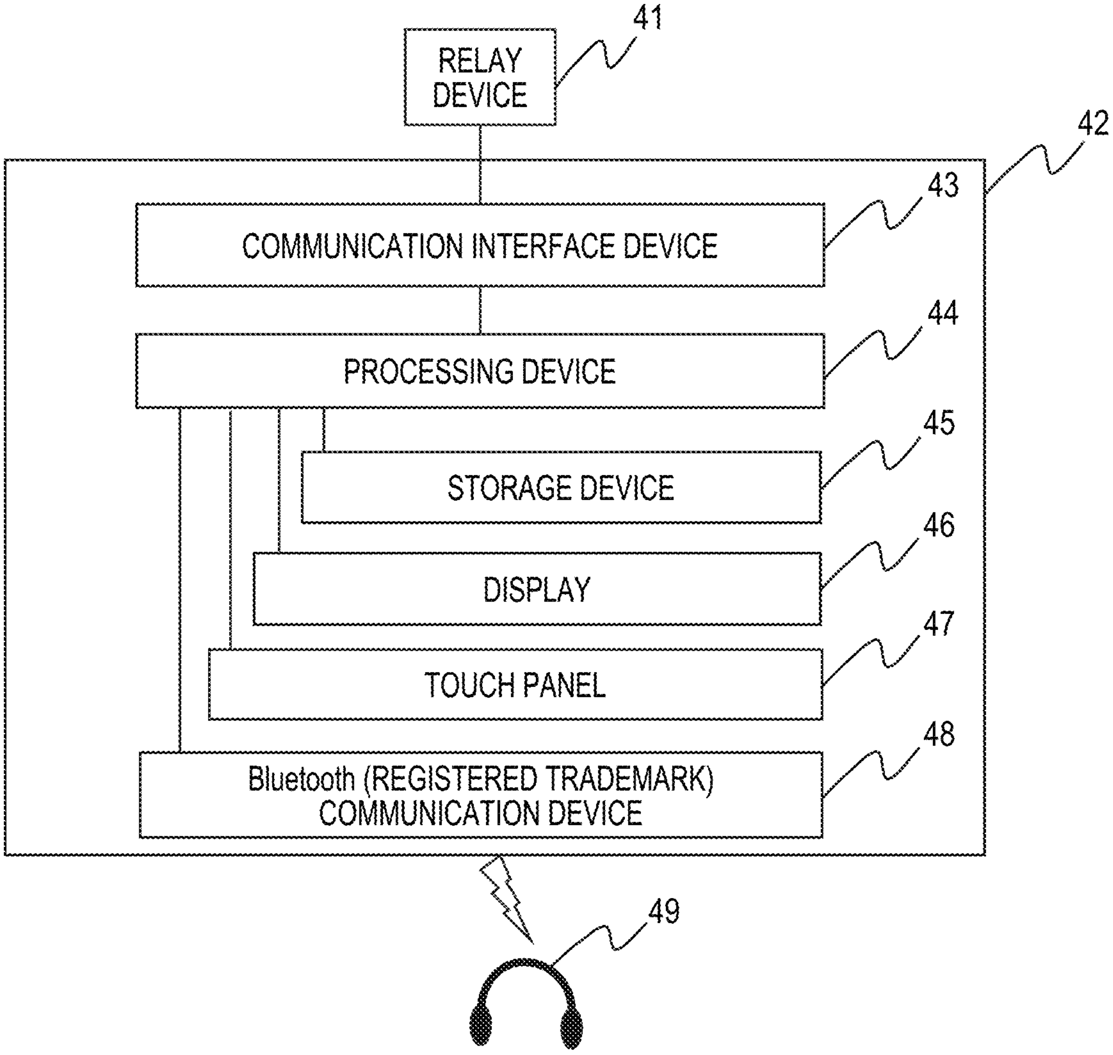
FIG. 4 is a schematic diagram illustrating a configuration example of a wireless communication device according to Embodiment 1.

Next, a configuration example of a wireless communication device according to the present embodiment will be described with reference to FIG. 4. FIG. 4 is a schematic diagram illustrating a configuration example of the wireless communication device according to Embodiment 1.

A seat monitor 42, which is an example of the wireless communication device, includes a communication interface device 43, a processing device 44, a storage device 45, a display 46, a touch panel 47, and a Bluetooth (registered trademark) communication device 48. In order to simplify the description, only portions related to the present embodiment are shown in FIG. 4. Therefore, the seat monitor 42 may further include a portion other than the portions shown in FIG. 4. In addition, a configuration of the seat monitor 42 illustrated in FIG. 4 is an example, and one portion may be divided into a plurality of portions, or a plurality of portions may be integrated into one portion.

The communication interface device 43 performs wired communication with an external device by wired connection, and transmits and receives various data. In the present embodiment, the seat monitor 42 is connected to a relay device in a wired manner so as to transmit and receive data. Accordingly, the seat monitor 42 performs wired communication with another seat monitor present in the cabin of the aircraft, and can recognize a wireless communication status including communication parameters of the other seat monitor.

The processing device 44 implements various functions as a wireless communication device by reading and executing various programs and data stored in the storage device 45. The processing device 44 is implemented using, for example, a central processing unit (hereinafter, referred to as a "CPU"). The processing device 44 plays back a content such as a movie and a music stored in the storage device 45. The processing device 44 plays back the content such as a movie and a music based on a passenger operation input from the touch panel 47. The processing device 44 displays the content such as a movie or a music to be played on the display 46. The processing device 44 implements various functions as a control unit in the wireless communication device.

The storage device 45 is implemented using a volatile or non-volatile storage device such as a random access memory (hereinafter referred to as a "RAM") or a read only memory (hereinafter referred to as a "ROM"). The storage device 45 temporarily holds a program and data necessary for the execution of an operation of the processing device 44, as well as data or information generated during the operation. The RAM is, for example, a work memory used when the processing device 44 operates. The ROM stores and holds in advance, for example, a program and data for controlling the processing device 44. The storage device 45 implements various functions as a recording unit in the wireless communication device.

The Bluetooth (registered trademark) communication device 48 performs Bluetooth (registered trademark) communication with a BT earphone 49 brought in by the passenger. The seat monitor 42 can transmit audio data of the content such as a movie or a music played by the processing device 44 to the BT earphone 49 by the Bluetooth (registered trademark) communication device 48.

In the present embodiment, the seat monitor is implemented similarly to the seat monitor 42.

[Communication Sequence]

Next, Bluetooth communication assumed in the present embodiment will be described with reference to FIG. 5. A communication method called frequency hopping is used in the Bluetooth (registered trademark) communication. In the communication method, a frequency band from 2.4 GHz to 2.5 GHz is divided into 79 channels for each 1 MHz. In the communication method, communication is performed by changing the 79 channels 1600 times per second, that is, every 625 μs. A channel change pattern is determined in advance based on an address or the like between Bluetooth (registered trademark) terminals, in other words, between a seat monitor and a BT earphone. Therefore, the Bluetooth (registered trademark) terminals, in other words, the seat monitor and the BT earphone can perform communication by changing a channel every 625 μs based on the predetermined channel change pattern.

Figure 5:
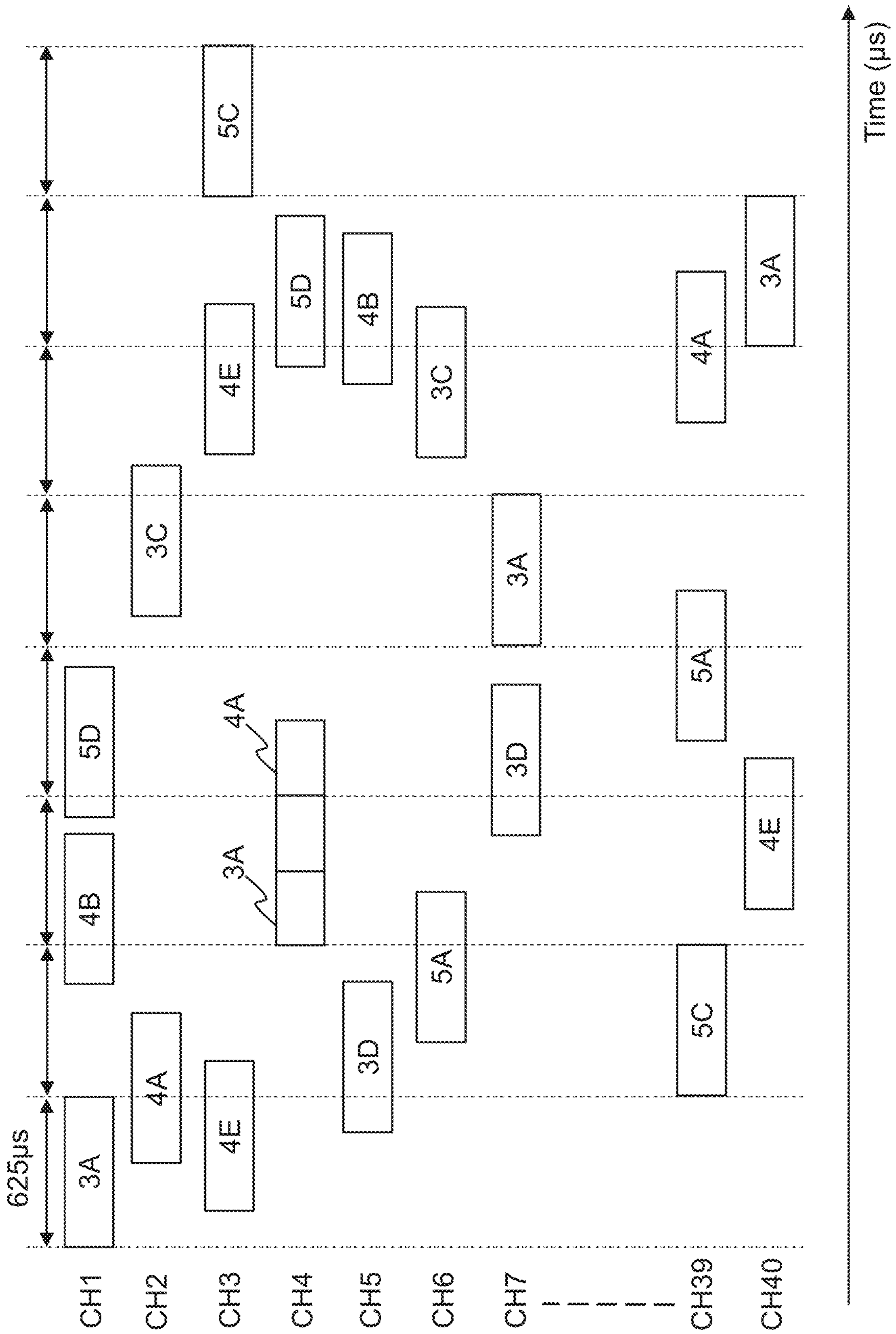
FIG. 5 is a schematic diagram illustrating a communication sequence of wireless communication devices according to Embodiment 1.

FIG. 5 is a schematic diagram illustrating a communication sequence of the wireless communication devices according to Embodiment 1. The schematic diagram illustrated in FIG. 5 is a schematic diagram of a communication sequence of the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D of the wireless communication system 11. That is, the schematic diagram illustrated in FIG. 5 is a schematic diagram of the communication sequence of the seat monitors that are present in the interference region 12 and perform communication when the seat monitor 4C newly starts communication. In addition, the description "CH" means a channel.

The Bluetooth communication can use 79 channels. However, in the present embodiment, all the seat monitors of the wireless communication system 11 are set to use 40 channels among the 79 channels for communication. The frequency band from 2.4 GHz to 2.5 GHz may also be used, for example, in Wi-Fi (registered trademark). Therefore, in order to avoid contention for a communication resource between the Bluetooth (registered trademark) communication and the Wi-Fi (registered trademark) in the aircraft, such limitation of used channels may often be set. In the present embodiment, the communication resource means a frequency band.

Each seat monitor changes a channel every 625 μs based on a preset pattern. In FIG. 5, a channel change pattern every 625 μs of the seat monitor 3A is shown by broken lines. The other seat monitors such as the seat monitor 4A and the seat monitor 4B also change channels every 625 μs based on the change patterns set every 625 μs.

For example, the seat monitor 3A switches a channel every 625 μs as follows.

CH1→no communication→CH4→communication without communication→CH7→no communication→CH40

The seat monitor 3A, the seat monitor 3C, the seat monitor 3D, the seat monitor 4A, the seat monitor 4B, the seat monitor 4E, the seat monitor 5A, the seat monitor 5C, and the seat monitor 5D perform communication by selecting 40 channels at regular time intervals. If a plurality of seat monitors select the same channel at the same timing, communication quality may deteriorate. For example, as illustrated in FIG. 5, when the seat monitor 3A and the seat monitor 4A select the channel 4 at the same timing, radio wave interference may occur, resulting in deterioration of communication quality.

Such an interference occurrence probability changes depending on the channels and a wireless usage rate over time. The wireless usage rate is a ratio of the transmission amount of data in communication performed by the wireless communication device present in the interference region to the communication capacity implemented by the communication resource. Simply put, the wireless usage rate indicates how much of the communication capacity that can be implemented by the communication resource is being used. The wireless usage rate is calculated based on the number of seat monitors performing communication and communication parameters in communication of the seat monitors performing communication. The larger the wireless usage rate, the higher a probability of interference of radio waves. Accordingly, the communication quality deteriorates, and deterioration of an audio quality such as occurrence of audio interruption of an audio such as a movie or a music may occur.

The wireless usage rate is calculated as follows. As an example, the wireless usage rate is calculated in a case in which the number of used channels is 40, the number of seat monitors performing communication is 10, the audio communication rate in communication of each seat monitor is 400 kbps, and the wireless section communication rate in communication of each seat monitor is 1 Mbps. In the present embodiment, each seat monitor transmits the audio data of the content such as a movie or a music to the BT earphone. Therefore, the application data communication rate will be described as the audio communication rate. A total communication rate required for the application in each of the seat monitors is obtained as in Expression (1).

$$400\,(kbps)\times 10 = 4\,(Mbps) \quad (1)$$

According to Expression (1), the audio communication rate and the number of seat monitors are multiplied, and a total audio communication rate of ten seat monitors is calculated.

A communication capacity in the entire communication is obtained as in Expression (2).

$$40\times 1\,(Mbps) = 40\,(Mbps) \quad (2)$$

According to Expression (2), the number of channels and the wireless section communication rate are multiplied, and the communication capacity in the entire communication is calculated.

The wireless usage rate is obtained as in Expression (3) by using the communication capacity of the entire communication as a denominator and using the necessary total audio communication rate as a numerator.

$$4\,(Mbps)\div 40\,(Mbps) = 10\% \quad (3)$$

Therefore, the wireless usage rate is 10% in the case in which the number of used channels is 40, the number of seat monitors performing communication is 10, the audio communication rate in communication of each seat monitor is 400 kbps, and the wireless section communication rate in communication of each seat monitor is 1 Mbps.

How much the wireless usage rate is allowed needs to be determined according to a subjective evaluation or the like as a system. In the present embodiment, in order to ensure an audio quality equal to or higher than a fixed level, the wireless usage rate is defined to be less than 10%, and the communication parameters are adjusted based on a defined value.

In the present embodiment, each communication parameter is adjusted to any one of the following values.

That is, the audio communication rate is adjusted to any one of 200 kbps, 300 kbps, and 400 kbps. In addition, the wireless section communication rate is adjusted to any one of 1 Mbps, 2 Mbps, and 3 Mbps.

The value assumed as the wireless section communication rate is the same value as a value defined in actual Bluetooth (registered trademark) communication.

[Processing Flow]

Figure 6:
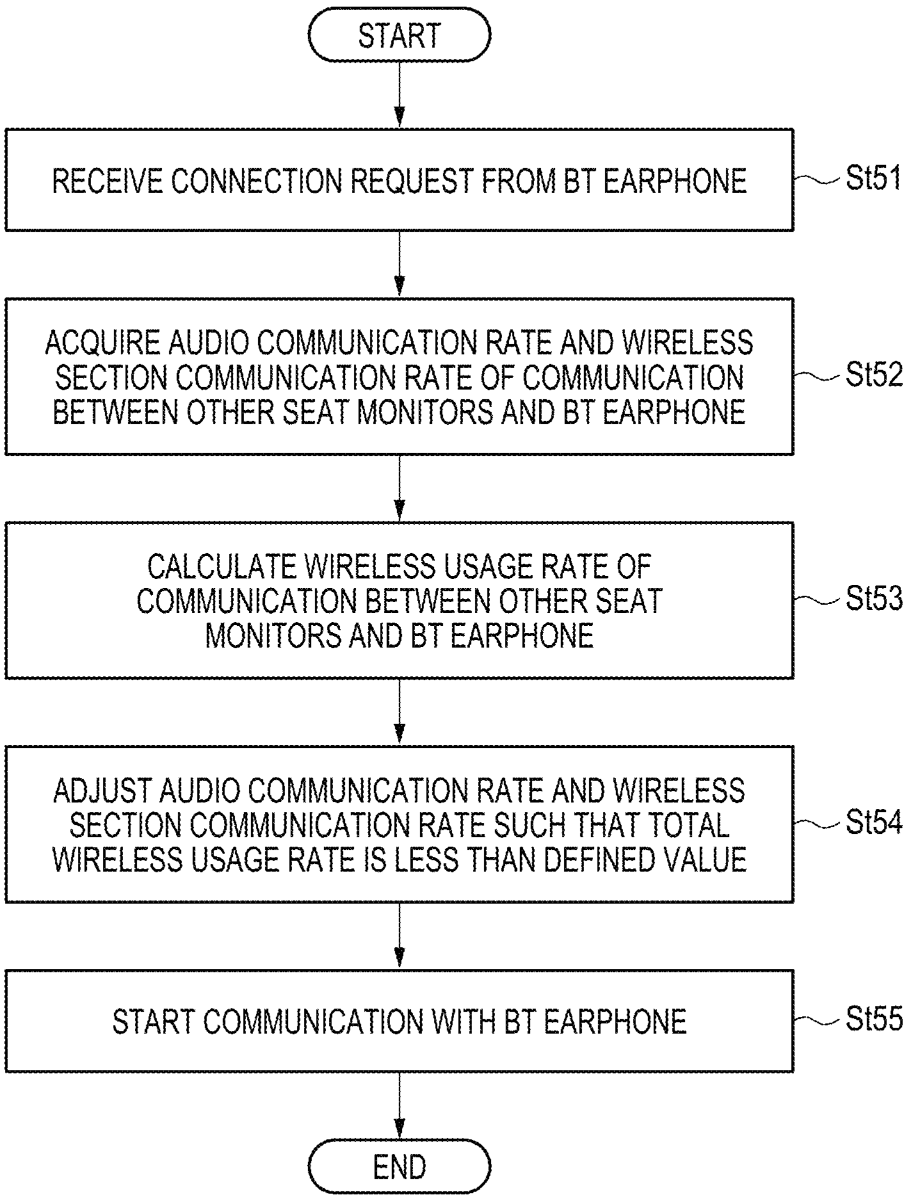
FIG. 6 is a flowchart illustrating processing related to communication start of the wireless communication device according to Embodiment 1.

Next, an operation when the seat monitor 4C newly starts Bluetooth (registered trademark) communication in the wireless communication system 11 illustrated in FIG. 1 will be described. FIG. 6 is a flowchart illustrating processing related to communication start of the wireless communication device according to Embodiment 1. Each processing of the flowchart in FIG. 6 is executed when a processing device of the seat monitor 4C cooperates with each portion. At the start of this flowchart, the seat monitor 4C holds the received radio wave intensity data in the storage device. In addition, the seat monitor 4C can calculate the interference region 12 based on the received radio wave intensity data. Therefore, the seat monitor 4C recognizes that the seat monitor 3A, the seat monitor 3B, the seat monitor 3C, the seat monitor 3D, the seat monitor 3E, the seat monitor 4A, the seat monitor 4B, the seat monitor 4D, the seat monitor 4E, the seat monitor 5A, the seat monitor 5B, the seat monitor 5C, the seat monitor 5D, and the seat monitor 5E are present in the interference region 12. The seat monitor 4C further recognizes that the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D among the seat monitors perform communication.

The Bluetooth (registered trademark) communication device of the seat monitor 4C receives a connection request for Bluetooth (registered trademark) communication from a BT earphone, which is a wireless communication terminal (step St51).

When the Bluetooth (registered trademark) communication device of the seat monitor 4C receives the connection request in the processing of step St51, the communication interface device of the seat monitor 4C acquires an audio communication rate and a wireless section communication rate of communication of each seat monitor that is present in the interference region 12 and performs communication (step St52). That is, the seat monitor 4C acquires an audio communication rate and a wireless section communication rate of communication of each of the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D.

Hereinafter, the description will be given assuming that the communication of each of the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D acquired by the seat monitor 4C has an audio communication rate of 400 kbps and a wireless section communication rate of 1 Mbps.

The processing device of the seat monitor 4C calculates a wireless usage rate based on the communication parameters acquired in step St52 (step St53). The number of used channels is 40 and the number of seat monitors is 9, and thus the wireless usage rate is obtained as in Expression (4).

$$(400\,(kbps)\times 9)\div(40\times 1\,(Mbps)) = 9\% \quad (4)$$

The processing device of the seat monitor 4C adjusts the audio communication rate and the wireless section communication rate, which are the communication parameters, such that the wireless usage rate when the seat monitor 4C starts communication is less than a predetermined defined value, that is, 10% (step St54). The communication parameters adjusted in the processing of step St54 include not only the communication parameters of the seat monitor 4C but also communication parameters of the other seat monitors during communication. The management of the communication parameters will be described later in detail.

The seat monitor 4C starts communication with the BT earphone using the communication parameters thereof determined in step St54 (step St55). Then, the processing flow ends.

The management of the communication parameters in the processing of step St54 will be described with reference to FIGS. 7, 8, and 9. FIG. 7 is a table illustrating an example of management of the communication parameters according to Embodiment 1.

The communication of each of the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D other than the seat monitor 4C has the audio communication rate of 400 kbps and the wireless section communication rate of 1 Mbps. In addition, the wireless usage rates of nine seat monitors other than the seat monitor 4C are 9%. The wireless usage rate of each of the nine seat monitors is obtained as in Expression (5) by using the communication capacity of the entire communication as a denominator and using the audio communication rate of each seat monitor as a numerator.

$$400\,(kbps) \div 40(Mbps) = 1\% \tag{5}$$

The wireless usage rate of each of the nine seat monitors is 1%, and thus the total wireless usage rate of nine seat monitors is 9%.

The total wireless usage rate is 9%, that is, less than 10% in a state in which the seat monitor 4C does not start Bluetooth (registered trademark) communication, and thus constant communication quality is ensured.

At this time, when the seat monitor 4C starts the Bluetooth (registered trademark) communication at an audio communication rate of 400 kbps and a wireless section communication rate of 1 Mbps similar to the other nine seat monitors, the wireless usage rate of the seat monitor 4C is 1%. Therefore, the total wireless usage rate of the ten seat monitors is 10%. In this case, the communication quality may deteriorate.

In order to prevent the deterioration of the communication quality, the seat monitor 4C requests the seat monitor 3A, the seat monitor 4A, the seat monitor 5A, the seat monitor 4B, the seat monitor 3C, the seat monitor 5C, the seat monitor 3D, the seat monitor 5D, and the seat monitor 4E to change the audio communication rate from 400 kbps to 300 kbps based on wired communication. Each seat monitor that receives the request changes the audio communication rate.

The wireless usage rate when the audio communication rate of each seat monitor is changed to 300 kbps will be described with reference to FIG. 8. FIG. 8 is a table illustrating an example of management of communication parameters according to Embodiment 1.

The audio communication rate of the seat monitor 4C that newly starts communication is also set to 300 kbps. In addition, the wireless section communication rate is set to 1 Mbps on each seat monitor. At this time, the total wireless usage rate of the seat monitors is obtained as in Expression (6).

$$(300\,(kbps) \times 10) \div (40 \times 1\,(Mbps)) = 7.5\% \tag{6}$$

By adjusting the communication parameters of each seat monitor to respective values illustrated in FIG. 8, the wireless usage rate is less than 10%, which is the defined value. Accordingly, in the wireless communication system 11, the seat monitor 4C can newly start the Bluetooth (registered trademark) communication while ensuring desired communication quality and audio quality.

As another example of the adjustment of the communication parameters, in order to prevent the deterioration of the communication quality, the seat monitor 4C requests the seat monitor 5C, the seat monitor 3D, the seat monitor 5D, and the seat monitor 4E to change the audio communication rate from 400 kbps to 300 kbps based on wired communication. Each seat monitor that receives the request changes the audio communication rate.

FIG. 9 is a table illustrating an example of management of communication parameters according to Embodiment 1. As illustrated in FIG. 9, the seat monitor 3A, the seat monitor 4A, the seat monitor 5A, the seat monitor 4B, and the seat monitor 3C maintain the audio communication rate at 400 kbps and the wireless section communication rate at 1 Mbps. On the other hand, the seat monitor 3C, the seat monitor 5C, the seat monitor 3D, and the seat monitor 5D change the audio communication rate from 400 kbps to 300 kbps while maintaining the wireless section communication rate at 1 Mbps. In the example of FIG. 9, the audio communication rate is set to 300 kbps and the wireless section communication rate is set to 1 Mbps for the seat monitor 4C that newly starts communication.

In the example of FIG. 9, there are five seat monitors having an audio communication rate of 400 kbps, and five seat monitors having an audio communication rate of 300 kbps. The total wireless usage rate of the seat monitors is obtained as in Expression (7).

$$(400\,(kbps) \times 5 + 300\,(kbps) \times 5) \div (40 \times 1\,(Mbps)) = 8.75\% \tag{7}$$

By adjusting the communication parameters of each seat monitor to respective values illustrated in FIG. 9, the wireless usage rate is less than 10%, which is the defined value. Accordingly, in the wireless communication system 11, the seat monitor 4C can newly start the Bluetooth (registered trademark) communication while ensuring desired communication quality and audio quality. In addition, in the example of FIG. 9, the seat monitor 3A, the seat monitor 4A, the seat monitor 5A, the seat monitor 4B, and the seat monitor 3C have larger audio communication rates than the seat monitor 3C, the seat monitor 5C, the seat monitor 3D, and the seat monitor 5D, and thus the audio quality is also good.

Figure 10:
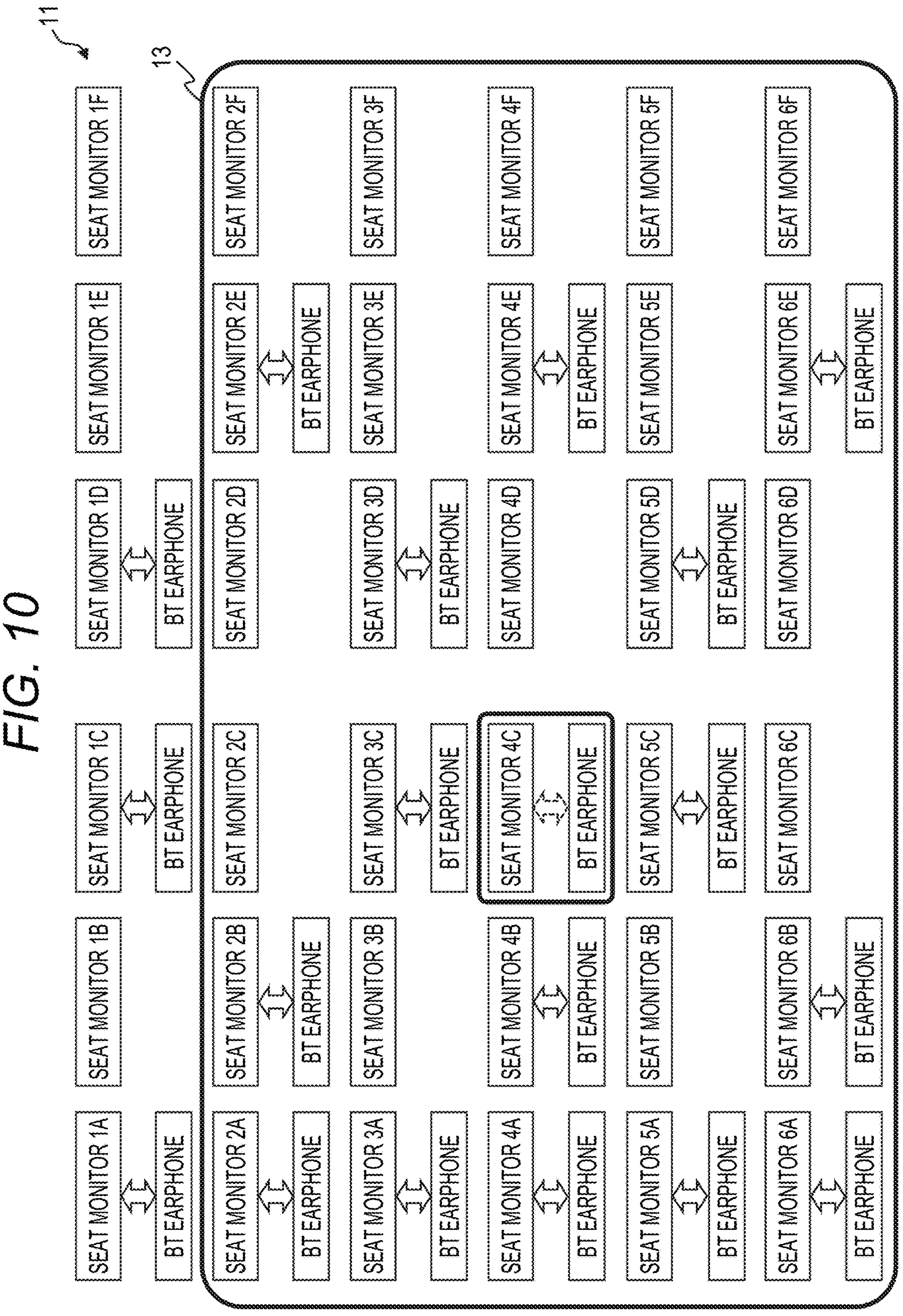
FIG. 10 is a schematic diagram illustrating an example of a wireless interference region according to Embodiment 1.

With reference to FIGS. 10 and 11, an example will be described in which the wireless section communication rate is changed from 1 Mbps to 2 Mbps while maintaining the audio communication rate of each seat monitor at 400 kbps in the adjustment of the communication parameters when the seat monitor 4C starts communication. The seat monitor 4C requests the other seat monitors to change the wireless section communication rate from 1 Mbps to 2 Mbps. The wireless section communication rate of each seat monitor may be uniformly set in the wireless communication system 11 based on the request from the seat monitor 4C or may be set in advance by the user such as the administrator of the wireless communication system 11.

Generally, when the wireless section communication rate is large, that is, when the communication speed is high, the interference region of the wireless communication is widened. FIG. 10 is a schematic diagram illustrating an example of a wireless interference region according to Embodiment 1. The seat monitor 4C calculates an interference region 13 when the wireless section communication rate of each seat monitor is 2 Mbps.

The seat monitors that are present in the interference region 13 and perform communication are 15 seat monitors including the seat monitor 2A, the seat monitor 2B, the seat monitor 2E, the seat monitor 6A, the seat monitor 6B, and the seat monitor 6E in addition to the seat monitor 3A, the seat monitor 3C, the seat monitor 3D, the seat monitor 4A, the seat monitor 4B, the seat monitor 4E, the seat monitor 5A, the seat monitor 5C, and the seat monitor 5D.

That is, by changing the wireless section communication rate of each seat monitor from 1 Mbps to 2 Mbps, when the seat monitor 4C starts communication, there is a new possibility that the radio waves of the communication of the seat monitor 4C interfere with the radio waves of the communication of the seat monitor 2A, the seat monitor 2B, the seat monitor 2E, the seat monitor 6A, the seat monitor 6B, and the seat monitor 6E.

FIG. 11 is a table illustrating an example of management of communication parameters according to Embodiment 1.

As illustrated in FIG. 10, the wireless section communication rate in the communication of each seat monitor is changed from 1 Mbps to 2 Mbps, and thus when the seat monitor 4C starts communication, the number of seat monitors performing communication and may cause interference of radio waves increases. As illustrated in FIG. 11, the number of seat monitors for which the wireless usage rates are calculated increases from 10 to 16 as in the examples of FIGS. 7, 8, and 9.

The number of channels used in communication is 40. A communication capacity in the entire communication is obtained as in Expression (8).

$$40 \times 2\ (Mbps) = 80\ (Mbps) \tag{8}$$

Therefore, the wireless usage rate per one seat monitor is obtained as in Expression (9).

$$400\ (kbps) \div 80 (Mbps) = 0.5\% \tag{9}$$

The wireless usage rate per one seat monitor is 0.5%, and thus the total wireless usage rate of 16 seat monitors is 8%. Therefore, at this time, the wireless usage rate is less than 10%, which is the defined value.

In the example of FIG. 11, the audio communication rate is maintained at 400 kbps and the wireless usage rate is also less than the defined value, and thus there is a low possibility of occurrence of radio wave interference. Therefore, when wireless communication is stably performed, high-quality audio data transmission can be implemented without decreasing the audio communication rate. However, the wireless section communication rate is increased from 1 Mbps to 2 Mbps, and thus the stability of the wireless communication alone may be reduced even if the occurrence probability of the radio wave interference is small. For example, when the wireless section communication rate is increased to 3 Mbps, the interference region becomes excessively wide, and the communication quality may deteriorate. The communication parameters are not limited to the examples shown in FIGS. 8, 9, and 11, and may be adjusted to appropriate values to ensure the communication quality.

In Embodiment 1, when a wireless communication device starts communication with a wireless communication terminal, the wireless communication device calculates a wireless communication device in which interference of wireless communication is able to occur based on position information of other wireless communication devices, and calculates a usage status of a communication resource of the wireless communication device in which the interference of the wireless communication is able to occur. The wireless communication device that newly starts communication adjusts communication parameters based on the calculated usage status of the communication resource so as to satisfy conditions of the usage status of the communication resource that can ensure a predetermined fixed level of communication quality, and starts communication.

An example of the usage status of the communication resource is a wireless usage rate. The communication parameters are adjusted such that a total wireless usage rate including the wireless usage rate of the wireless communication device that newly starts communication is less than a predetermined defined value.

Examples of communication parameters include an audio communication rate and a wireless section communication rate, which are communication rates of an application layer. The communication parameters to be adjusted include not only the communication parameters of the wireless communication device that newly starts communication but also communication parameters of wireless communication devices that already perform wireless communication.

In Embodiment 1, under the assumption that each of the plurality of wireless communication devices recognizes an absolute position of other wireless communication devices, when the plurality of wireless communication devices share a communication resource in a closed space, the wireless communication system 11 recognizes a communication status of each wireless communication device, and adjusts communication parameters in communication of each wireless communication device, thereby securing a predetermined fixed level of communication quality.

[Modification]

In Embodiment 1, the Bluetooth (registered trademark) communication is described as an example of a communication method. However, the present disclosure is not limited thereto, and the present disclosure is also applicable to a communication method in which other predetermined communication capacity is limited.

In addition, in Embodiment 1, with reference to FIG. 4, an example is shown in which the seat monitor 42, which is a wireless communication device, includes the storage device 45. However, the present disclosure is not limited thereto, and for example, the wireless communication system 11 may include a server that can implement various functions of the storage device 45. For example, the received radio wave intensity data may be held in a database constructed on the server accessible by the wireless communication device.

In addition, in Embodiment 1, with reference to FIG. 9, an example is shown in which the audio communication rates of the four seat monitors are changed from 400 kbps to 300 kbps while maintaining the audio communication rates of the five seat monitors at 400 kbps. However, the present disclosure is not limited thereto, and the number of seat monitors for which the communication parameters are changed may be appropriately adjusted in the wireless communication system 11 in order to ensure a fixed level of communication quality. The number of seat monitors for which various communication parameters are changed and an order in which various communication parameters are adjusted may be combined in various patterns. The order in which the various communication parameters are adjusted is, for example, an order in which the wireless section communication rate is adjusted after the audio communication rate is adjusted, or an order in which the audio communication rate is adjusted after the wireless section communication rate is adjusted.

(Summary of Present Disclosure)

The following techniques are disclosed according to the above description of Embodiment 1.

<Technique 1>

A wireless communication system (for example, wireless communication system 11) according to the present embodiment includes a plurality of wireless communication devices (for example, seat monitor 1A and seat monitor 2A) capable of performing wireless communication with a wireless communication terminal (for example, BT earphone) and disposed at different positions, and the wireless communication devices include: a storage device (for example, storage device 45) configured to hold radio wave intensity data corresponding to position information of each of the plurality of wireless communication devices; and a processing device (for example, processing device 44) configured to, when communication with the wireless communication terminal is started, calculate a region (for example, interference region 12) in which interference of radio waves is able to occur based on the radio wave intensity data, calculate a usage status of a communication resource by the wireless communication devices present in the region based on a communication status of the wireless communication devices present in the region among the plurality of wireless communication devices, and adjust a communication parameter that defines a transmission amount of data in communication with the wireless communication terminal based on a calculation result of the usage status.

Accordingly, in the wireless communication system according to the present embodiment, the wireless communication device can acquire and hold the radio wave intensity data corresponding to the position information of each of the plurality of wireless communication devices. In addition, when the communication with the wireless communication terminal is started, the wireless communication device can calculate the region in which the interference of the radio waves is able to occur based on the radio wave intensity data. In addition, the wireless communication device can calculate the usage status of the communication resource by the wireless communication devices present in the region based on the communication status of the wireless communication devices present in the region. In addition, the wireless communication system can adjust the communication parameter that defines the transmission amount of data in communication with the wireless communication terminal based on the usage status. Accordingly, the wireless communication system can ensure constant communication quality even when the plurality of wireless communication devices and the wireless communication terminal share one communication resource.

<Technique 2>

In the wireless communication system according to Technique 1, the usage status of the communication resource includes a wireless usage rate, and the wireless usage rate is a ratio of the transmission amount of data in communication performed by the wireless communication devices present in the region to a communication capacity implemented by the communication resource.

Accordingly, in the wireless communication system, the wireless communication device can calculate the wireless usage rate of the wireless communication devices present in the region.

<Technique 3>

In the wireless communication system according to Technique 2, the processing device may adjust the communication parameter such that the wireless usage rate is equal to or less than a defined value.

Accordingly, in the wireless communication system, the wireless communication device can adjust the communication parameter such that the wireless usage rate of the wireless communication devices present in the region is equal to or less than the predetermined defined value.

<Technique 4>

In the wireless communication system according to any one of Techniques 1 to 3, the plurality of wireless communication devices include a first wireless communication device that newly starts communication with the wireless communication terminal, and at least one second wireless communication device that has already performed communication with terminals other than the wireless communication terminal, the communication parameter includes an application data communication rate that defines a transmission amount of data of application communication capable of being performed with the wireless communication terminal, and the application data communication rate may include an application data communication rate of the first wireless communication device and an application data communication rate of the second wireless communication device present in the region.

Accordingly, in the wireless communication system, the wireless communication device can adjust the application data communication rate such that the wireless usage rate is equal to or less than the predetermined defined value. In addition, the application data communication rate may include the application data communication rate of the first wireless communication device that newly starts communication with the wireless communication terminal. In addition, the application data communication rate may include the application data communication rate of at least one second wireless communication device that has already perform communication with a terminal other than the wireless communication terminal.

<Technique 5>

In the wireless communication system according to Technique 4, the data of application communication is audio data including audio information, and the application data communication rate may be an audio communication rate that defines a transmission amount of the audio data.

Accordingly, in the wireless communication system, the wireless communication device can adjust an audio communication rate that defines a transmission amount of audio data of a content such as a movie or a music.

<Technique 6>

In the wireless communication system according to any one of Techniques 1 to 5, the plurality of wireless communication devices include a first wireless communication device that newly starts communication with the wireless communication terminal, and at least one second wireless communication device that has already performed communication with terminals other than the wireless communication terminal, the communication parameter includes a wireless section communication rate that defines a transmission amount of wireless communication data, and the wireless section communication rate may include a wireless section communication rate of the first wireless communication device and a wireless section communication rate of the second wireless communication device present in the region.

Accordingly, in the wireless communication system, the wireless communication device can adjust the wireless section communication rate such that the wireless usage rate is equal to or less than the predetermined defined value. In addition, the wireless section communication rate may include the wireless section communication rate of the first wireless communication device that newly starts communication with the wireless communication terminal. In addition, the wireless section communication rate may include the wireless section communication rate of at least one second wireless communication device that has already performed communication with the terminals other than the wireless communication terminal.

<Technique 7>

A wireless communication device according to the present embodiment is capable of performing wireless communication with a wireless communication terminal, and includes: a storage device configured to hold radio wave intensity data corresponding to position information of each of a plurality of the wireless communication devices disposed at different positions; and a processing device configured to, when communication with the wireless communication terminal is started, calculate a region in which interference of radio waves is able to occur based on the radio wave intensity data, calculate a usage status of a communication resource by the wireless communication devices present in the region based on a communication status of the wireless communication devices present in the region among the plurality of wireless communication devices, and adjust a communication parameter that defines a transmission amount of data in communication with the wireless communication terminal based on a calculation result of the usage status.

Accordingly, the wireless communication device according to the present embodiment can acquire and hold the radio wave intensity data corresponding to the position information of each of the plurality of wireless communication devices. In addition, when the communication with the wireless communication terminal is started, the wireless communication device can calculate the region in which the interference of the radio waves is able to occur based on the radio wave intensity data. In addition, the wireless communication device can calculate the usage status of the communication resource by the wireless communication devices present in the region based on the communication status of the wireless communication devices present in the region. In addition, the wireless communication system can adjust the communication parameter that defines the transmission amount of data in communication with the wireless communication terminal based on the usage status. Accordingly, the wireless communication device can ensure constant communication quality even when the plurality of other wireless communication devices and the wireless communication terminal share one communication resource.

<Technique 8>

In the wireless communication device according to Technique 7, the usage status of the communication resource includes a wireless usage rate, and the wireless usage rate is a ratio of the transmission amount of data in communication performed by the wireless communication devices present in the region to a communication capacity implemented by the communication resource.

Accordingly, the wireless communication device can calculate the wireless usage rate of the wireless communication devices present in the region.

<Technique 9>

In the wireless communication device according to Technique 8, the processing device may adjust the communication parameter such that the wireless usage rate is equal to or less than a defined value.

Accordingly, the wireless communication device can adjust the communication parameter such that the wireless usage rate of the wireless communication devices present in the region is equal to or less than the predetermined defined value.

<Technique 10>

In the wireless communication device according to any one of Techniques 7 to 9, the plurality of wireless communication devices include a first wireless communication device that newly starts communication with the wireless communication terminal, and at least one second wireless communication device that has already performed communication with terminals other than the wireless communication terminal, the communication parameter includes an application data communication rate that defines a transmission amount of data of application communication capable of being performed with the wireless communication terminal, and the application data communication rate may include an application data communication rate of the first wireless communication device and an application data communication rate of the second wireless communication device present in the region.

Accordingly, the wireless communication device can adjust the application data communication rate such that the wireless usage rate is equal to or less than the predetermined defined value. In addition, the application data communication rate may include the application data communication rate of the first wireless communication device that newly starts communication with the wireless communication terminal. In addition, the application data communication rate may include the application data communication rate of at least one second wireless communication device that has already performed communication with the terminals other than the wireless communication terminal.

<Technique 11>

In the wireless communication device according to Technique 10, the data of application communication is audio data including audio information, and the application data communication rate may be an audio communication rate that defines a transmission amount of the audio data.

Accordingly, the wireless communication device can adjust an audio communication rate that defines a transmission amount of audio data of a content such as a movie or a music.

<Technique 12>

In the wireless communication device according to any one of Techniques 7 to 11, the plurality of wireless communication devices include a first wireless communication device that newly starts communication with the wireless communication terminal, and at least one second wireless communication device that has already performed communication with terminals other than the wireless communication terminal, the communication parameter includes a wireless section communication rate that defines a transmission amount of wireless communication data, and the wireless section communication rate may include a wireless section communication rate of the first wireless communication device and a wireless section communication rate of the second wireless communication device present in the region.

Accordingly, the wireless communication device can adjust the wireless section communication rate such that the wireless usage rate is equal to or less than the predetermined defined value. In addition, the wireless section communication rate may include the wireless section communication rate of the first wireless communication device that newly starts communication with the wireless communication terminal. In addition, the wireless section communication rate may include the wireless section communication rate of at least one second wireless communication device that has already performed communication with the terminals other than the wireless communication terminal.

Although Embodiment 1 has been described above with reference to the drawings, it is needless to say that the present disclosure is not limited to such examples. It is apparent to those skilled in the art that various changes, corrections, substitutions, additions, deletions, and equivalents can be conceived within the scope of the claims, and it should be understood that such changes, corrections, substitutions, additions, deletions, and equivalents also fall within the technical scope of the present disclosure. In addition, components in Embodiment 1 described above may be combined freely in a range without deviating from the spirit of the invention.

The present disclosure is useful as the wireless communication system and the wireless communication device capable of ensuring the constant communication quality even when the plurality of the wireless communication devices and the wireless communication terminal share one communication resource.

What is claimed is:

1. A wireless communication system comprising: a plurality of wireless communication devices capable of performing wireless communication with a wireless communication terminal and each disposed at a different position, wherein the wireless communication devices include:

a storage device configured to hold radio wave intensity data corresponding to position information of each of the plurality of wireless communication devices; and a processing device configured to, when starting communication with the wireless communication terminal, (i) calculate a region in which interference of radio waves is able to occur based on the radio wave intensity data, (ii) obtain, via wired communication with each of wireless communication devices present in the region among the plurality of wireless communication devices, a communication status of each of the wireless communication devices present in the region among the plurality of wireless communication devices, (iii) calculate a usage status of a communication resource by the wireless communication devices present in the region based on the obtained communication status of each of the wireless communication devices present in the region among the plurality of wireless communication devices, and (iv) adjust a communication parameter that defines a transmission amount of data in communication with the wireless communication terminal based on a calculation result of the usage status, and the processing device is configured to adjust, via the wired communication with each of the wireless communication devices present in the region among the plurality of wireless communication devices, the communication parameter for each of the wireless communication devices present in the region among the plurality of wireless communication devices based on the calculation result of the usage status.

2. The wireless communication system according to claim 1, wherein the usage status of the communication resource includes a wireless usage rate, and the wireless usage rate is a ratio of the transmission amount of data in communication performed by the wireless communication devices present in the region to a communication capacity implemented by the communication resource.

3. The wireless communication system according to claim 2, wherein the processing device is configured to adjust the communication parameter such that the wireless usage rate is equal to or less than a defined value.

4. The wireless communication system according to claim 1, wherein the plurality of wireless communication devices include a first wireless communication device that newly starts communication with the wireless communication terminal, and at least one second wireless communication device that has already performed communication with a terminal other than the wireless communication terminal, the communication parameter includes an application data communication rate that defines a transmission amount of data in which an application is capable of performing communication between the wireless communication devices and the wireless communication terminal, and the application data communication rate includes an application data communication rate of the first wireless communication device and an application data communication rate of the second wireless communication device present in the region.

5. The wireless communication system according to claim 4, wherein the data in which the application performs communication is audio data including audio information, and the application data communication rate is an audio communication rate that defines a transmission amount of the audio data.

6. The wireless communication system according to claim 1, wherein the plurality of wireless communication devices include a first wireless communication device that newly starts communication with the wireless communication terminal, and at least one second wireless communication device that has already performed communication with a terminal other than the wireless communication terminal, the communication parameter includes a wireless section communication rate that defines a transmission amount of wireless communication data, and the wireless section communication rate includes a wireless section communication rate of the first wireless communication device and a wireless section communication rate of the second wireless communication device present in the region.

7. The wireless communication system according to claim 1, wherein the processing device is configured to adjust, via the wired communication with each of the wireless communication devices present in the region among the plurality of wireless communication devices, the communication parameter for each of the wireless communication devices present in the region among the plurality of wireless communication devices based on the calculation result of the usage status.

8. A wireless communication device capable of performing wireless communication with a wireless communication terminal, the wireless communication device comprising:

a storage device configured to hold radio wave intensity data corresponding to position information of each of a plurality of the wireless communication devices each disposed at a different position; and a processing device configured to, when starting communication with the wireless communication terminal, (i) calculate a region in which interference of radio waves is able to occur based on the radio wave intensity data, (ii) obtain, via wired communication with each of wireless communication devices present in the region among the plurality of wireless communication devices, a communication status of each of the wireless communication devices present in the region among the plurality of wireless communication devices, (iii) calculate a usage status of a communication resource by the wireless communication devices present in the region based on the obtained communication status of each of the wireless communication devices present in the region among the plurality of wireless communication devices, and (iv) adjust a communication parameter that defines a transmission amount of data in communication with the wireless communication terminal based on a calculation result of the usage status, wherein the processing device is configured to adjust, via the wired communication with each of the wireless communication devices present in the region among the plurality of wireless communication devices, the communication parameter for each of the wireless communication devices present in the region among the plurality of wireless communication devices based on the calculation result of the usage status.

9. The wireless communication device according to claim 8, wherein the usage status of the communication resource includes a wireless usage rate, and the wireless usage rate is a ratio of the transmission amount of data in communication performed by the wireless communication devices present in the region to a communication capacity implemented by the communication resource.

10. The wireless communication device according to claim 9, wherein the processing device is configured to adjust the communication parameter such that the wireless usage rate is equal to or less than a defined value.

11. The wireless communication device according to claim 8, wherein the plurality of wireless communication devices include a first wireless communication device that newly starts communication with the wireless communication terminal, and at least one second wireless communication device that has already performed communication with a terminal other than the wireless communication terminal, the communication parameter includes an application data communication rate that defines a transmission amount of data in which an application is capable of performing communication between the wireless communication devices and the wireless communication terminal, and the application data communication rate includes an application data communication rate of the first wireless communication device and an application data communication rate of the second wireless communication device present in the region.

12. The wireless communication device according to claim 11, wherein the data of application communication is audio data including audio information, and the application data communication rate is an audio communication rate that defines a transmission amount of the audio data.

13. The wireless communication device according to claim 8, wherein the plurality of wireless communication devices include a first wireless communication device that newly starts communication with the wireless communication terminal, and at least one second wireless communication device that already perform communication with terminals other than the wireless communication terminal, the communication parameter includes a wireless section communication rate that defines a transmission amount of wireless communication data, and the wireless section communication rate includes a wireless section communication rate of the first wireless communication device and a wireless section communication rate of the second wireless communication device present in the region.

14. The wireless communication device according to claim 8, wherein the processing device is configured to adjust, via the wired communication with each of the wireless communication devices present in the region among the plurality of wireless communication devices, the communication parameter for each of the wireless communication devices present in the region among the plurality of wireless communication devices based on the calculation result of the usage status.

* * * * *